(12) United States Patent
Hirai

(10) Patent No.: US 8,035,724 B2
(45) Date of Patent: Oct. 11, 2011

(54) METHOD AND APPARATUS FOR CONTROLLING LENS POSITION

(75) Inventor: Keisuke Hirai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 11/865,288

(22) Filed: Oct. 1, 2007

(65) Prior Publication Data

US 2008/0084495 A1   Apr. 10, 2008

(30) Foreign Application Priority Data

Oct. 6, 2006   (JP) .................................. 2006-275072

(51) Int. Cl.
*G03B 13/36* (2006.01)
*H04N 5/232* (2006.01)

(52) U.S. Cl. ........................ 348/347; 348/335; 396/86

(58) Field of Classification Search .................. None
See application file for complete search history.

(56) References Cited

U.S. PATENT DOCUMENTS

| | | | | |
|---|---|---|---|---|
| 5,406,345 A | * | 4/1995 | Hirasawa | 396/86 |
| 5,930,054 A | * | 7/1999 | Kasuya | 359/698 |
| 6,919,928 B1 | | 7/2005 | Kanayama | 348/345 |
| 2005/0205768 A1 | | 9/2005 | Atsuta et al. | 250/231.16 |
| 2005/0220449 A1 | * | 10/2005 | Hirai | 396/79 |
| 2005/0281551 A1 | * | 12/2005 | Ono et al. | 396/79 |
| 2006/0119732 A1 | * | 6/2006 | Ohta | 348/347 |
| 2006/0192092 A1 | | 8/2006 | Atsuta et al. | 250/231.13 |
| 2007/0018086 A1 | | 1/2007 | Atsuta et al. | 250/231.13 |
| 2007/0030377 A1 | * | 2/2007 | Ishiguro | 348/335 |
| 2007/0092239 A1 | * | 4/2007 | Katayama | 396/90 |

FOREIGN PATENT DOCUMENTS

| | | |
|---|---|---|
| EP | 0 682 450 | 11/1995 |
| EP | 0 869 380 | 10/1998 |
| EP | 1 041 364 | 10/2000 |
| EP | 1 065 549 | 1/2001 |
| EP | 1 081 524 | 3/2001 |
| EP | 1 583 354 | 10/2005 |
| JP | 10-274737 | 10/1998 |
| JP | 2005-291980 | 10/2005 |
| JP | 2006-214929 | 8/2006 |

\* cited by examiner

*Primary Examiner* — David Ometz
*Assistant Examiner* — Dwight Tejano
(74) *Attorney, Agent, or Firm* — Fitzpatrick, Cella, Harper & Scinto

(57) ABSTRACT

An optical apparatus includes a detection unit for detecting a reference position, a detection unit for detecting a relative position, and a control unit for outputting a control signal for the optical apparatus after an operation speed of a moveable input member for drive-controlling the optical apparatus becomes equal to or slower than a predetermined speed.

10 Claims, 13 Drawing Sheets

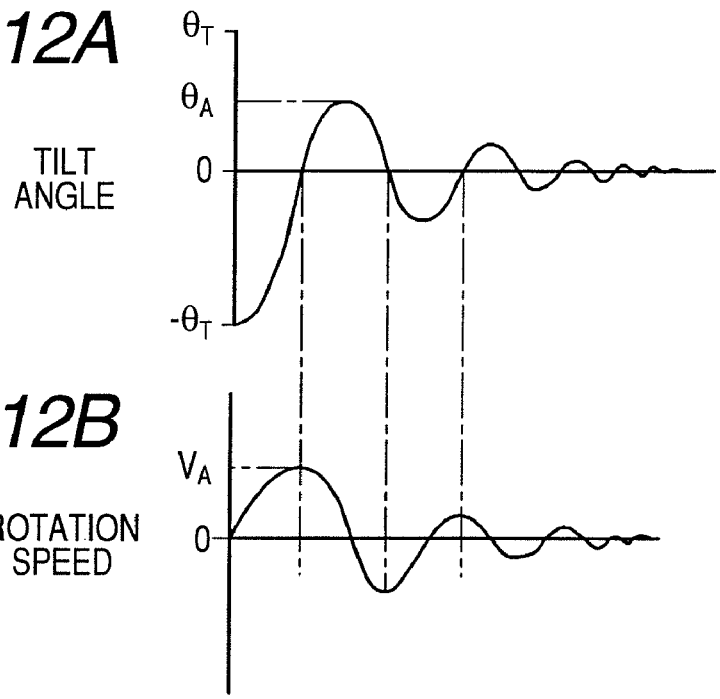
FIG. 12A
FIG. 12B
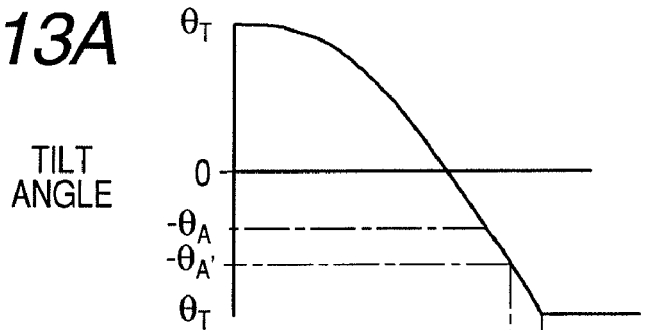
FIG. 13A
FIG. 13B

METHOD AND APPARATUS FOR CONTROLLING LENS POSITION

BACKGROUND OF THE INVENTION

1. Field of the Invention

The present invention relates to a lens device including a position detection unit for detecting the position of a movable portion such as an optical element or an operation portion, an optical apparatus such as a camera or a camera system to which the lens device can be attached, and an apparatus such as an operation device for the lens device. The present invention also relates to a method of setting a reference position of the position detection unit.

2. Description of the Related Art

A lens device connectable to a camera includes movable portions. Examples of the movable portions include multiple lenses driven for focusing and zooming, and a diaphragm for adjusting a light amount. The lens device further includes operation rings and demand portions which are used to drive the respective lenses.

In a normal rear-focus-type lens device, the positions of an optical element and an operation device are detected and position control is performed based on the detected positions. Therefore, in order to obtain a desirable focus state, it is necessary to improve the position detection precision of each of the optical element and the operation device.

For example, a rotary encoder may be used. According to the rotary encoder, a relative position is detected based on two signals whose phases are different from each other, that is, an A-phase signal and a B-phase signal. Further, a Z-phase signal for detecting a reference position is obtained. Therefore, relative position calculation for absolute position signal conversion is performed using the reference position as standard.

There is a case where a rotary encoder in which the Z-phase signal is not detected and instead a reference position detection unit, such as a potentiometer, is used. The operation device and the lens device which employ the position detection method are initialized in the following procedure.

In an initialization process of an operation portion of a zoom operation device (zoom demand device), a camera operator first determines that the zoom demand device is powered on and then operates the operation portion.

When the operation portion operated by the camera operator passes through a reference position of a reference position detection unit, an output of the reference position detection unit changes. A rising position or a falling position of the output is associated with a relative position indicated by a counted value for a relative position detection unit. A signal indicating a value obtained by subtracting an offset amount of the reference position (which is stored in advance) from the relative position is output as an absolute position signal.

As described, for example, in Japanese Patent Application Laid-Open No. H10-274737, in the case of a focus lens or a zoom lens in the lens device, when the lens is automatically moved after power-on, the counted value for the reference position detection unit and the reference position thereof are associated with each other and the initialization process is automatically performed.

The detection response speed of the relative position detection unit is different from the detection response speed of the reference position detection unit, so a detection position of the relative position detection unit is shifted from the reference position of the reference position detection unit.

The detection position is particularly significantly shifted in the case where the operation portion of the operation device or the optical element of the lens device, each of which is a position detection object, is moved at high speed. When the position detection precision of the operation portion of the zoom demand device is low, an accurate drive control signal corresponding to an operation amount of the zoom demand device is not output.

SUMMARY OF THE INVENTION

The present invention has been made to address the above-mentioned problem. An object of the present invention is to provide a lens device capable of taking a video image intended by a camera operator, an operation device for the lens device, and a reference position setting method for the lens device.

According to a first aspect of the present invention, there is provided an operation device for outputting a control signal for controlling an optical apparatus based on an amount of movement of a moveable input member. The device includes a reference position detector unit for detecting a reference position of the moveable input member; a relative position detector unit for detecting a relative position of the moveable input member; and a controller configured to calculate an amount of movement of the moveable input member based on the detected reference position and detected relative positions, and output the control signal based, on the amount of movement of the moveable input member which is obtained from the reference position and the relative position. The control signal is output after the device is powered on and then an operation speed of the moveable input member at a time when the reference position is detected becomes equal to or slower than a predetermined threshold speed.

According to a second aspect of the present invention, there is provided an optical apparatus including an optical element, including a reference position detection unit for detecting a reference position of the optical element; a relative position detection unit for detecting a relative position of the optical element; and a controller for outputting a position signal for the optical element based on the reference position and the relative position. The position signal is output to an external device after the optical apparatus is powered on and then a moving speed of the optical element at a time when the reference position is detected becomes equal to or slower than a predetermined threshold speed.

According to a third aspect of the present invention, there is provided a reference position setting method for an operation device which includes a moveable input member, a reference position detection unit for detecting a reference position of the moveable input member, and relative position detection means for detecting a relative position of the moveable input member, and which outputs a control signal for an optical apparatus based on a amount of movement of the moveable input member. The reference position setting method is a method of setting the reference position of the moveable input member, including powering on the operation device; detecting an operation speed of the moveable input member when the reference position is detected; comparing the operation speed of the moveable input member with a predetermined threshold speed; and outputting a control signal such that the control signal is not output when the operation speed of the operation device is faster than the predetermined threshold speed, and the control signal based on the reference position and the relative position is output when the operation speed of the operation device is equal to or slower than the predetermined threshold speed.

Further features of the present invention will become apparent from the following description of exemplary embodiments with reference to the attached drawings.

BRIEF DESCRIPTION OF THE DRAWINGS

FIGS. 12A and 12B are explanatory diagrams illustrating an operation in the case where the zoom demand operation portion is released at a counterclockwise end.

FIGS. 13A and 13B are explanatory diagrams illustrating an operation in the case where the zoom demand operation portion is forcibly operated by the hand at the clockwise end.

DESCRIPTION OF THE EMBODIMENTS

Figure 1:
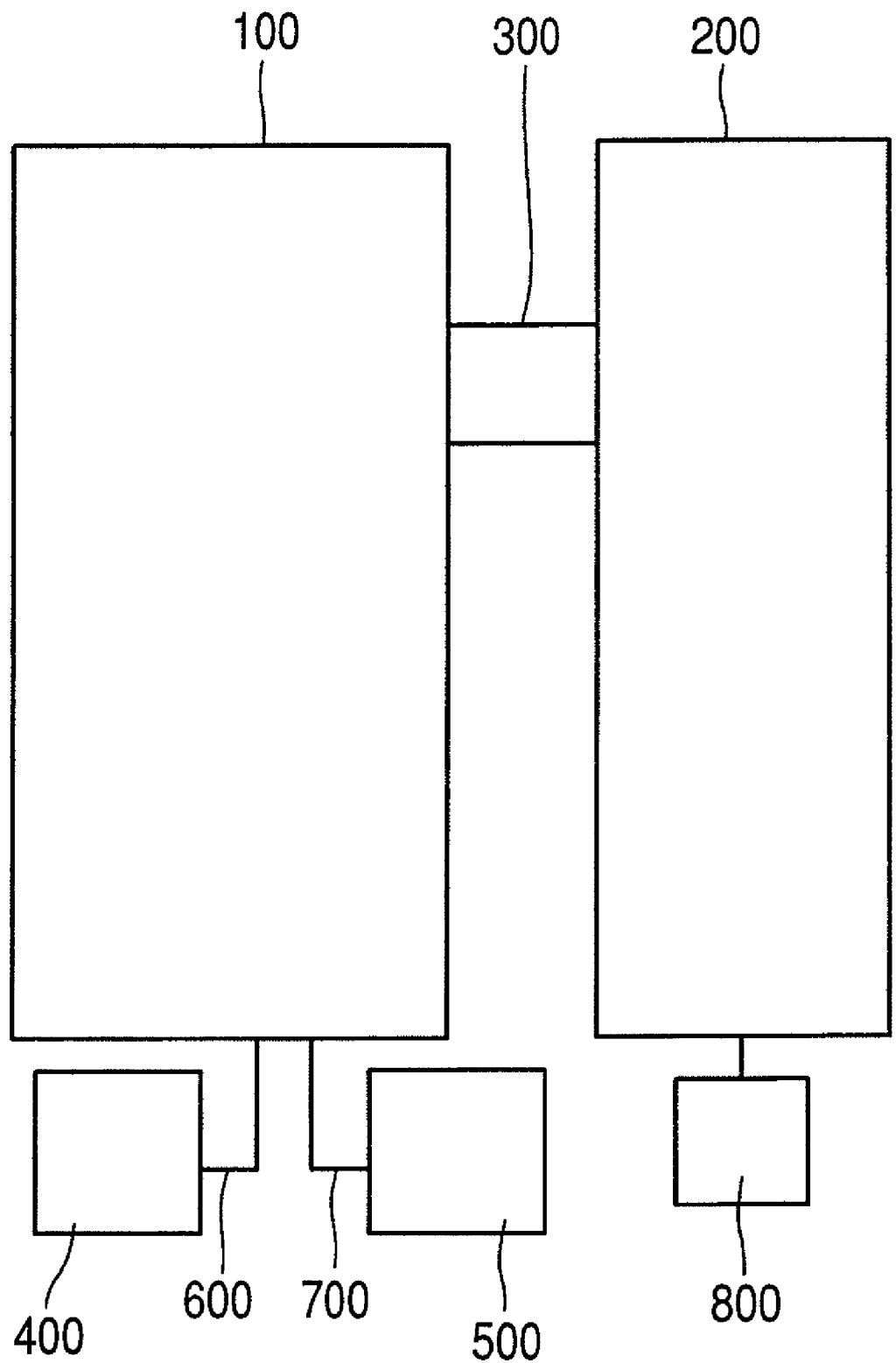
FIG. 1 is a block diagram illustrating the structure of an optical apparatus according to Embodiment 1 of the present invention.

The present invention will now be described in detail based on embodiments illustrated in the drawings.

Embodiment 1

FIG. 1 is a block diagram illustrating a structure of an optical apparatus according to Embodiment 1 of the present invention. A television lens portion 100 having a lens barrel and a television camera portion 200 are connected with each other through a lens cable 300. The television lens portion 100 is connected with a zoom demand portion 400 and a focus demand portion 500 through a zoom demand cable 600 and a focus demand cable 700. The television camera portion 200 is connected with a power supply portion 800.

Figure 2:
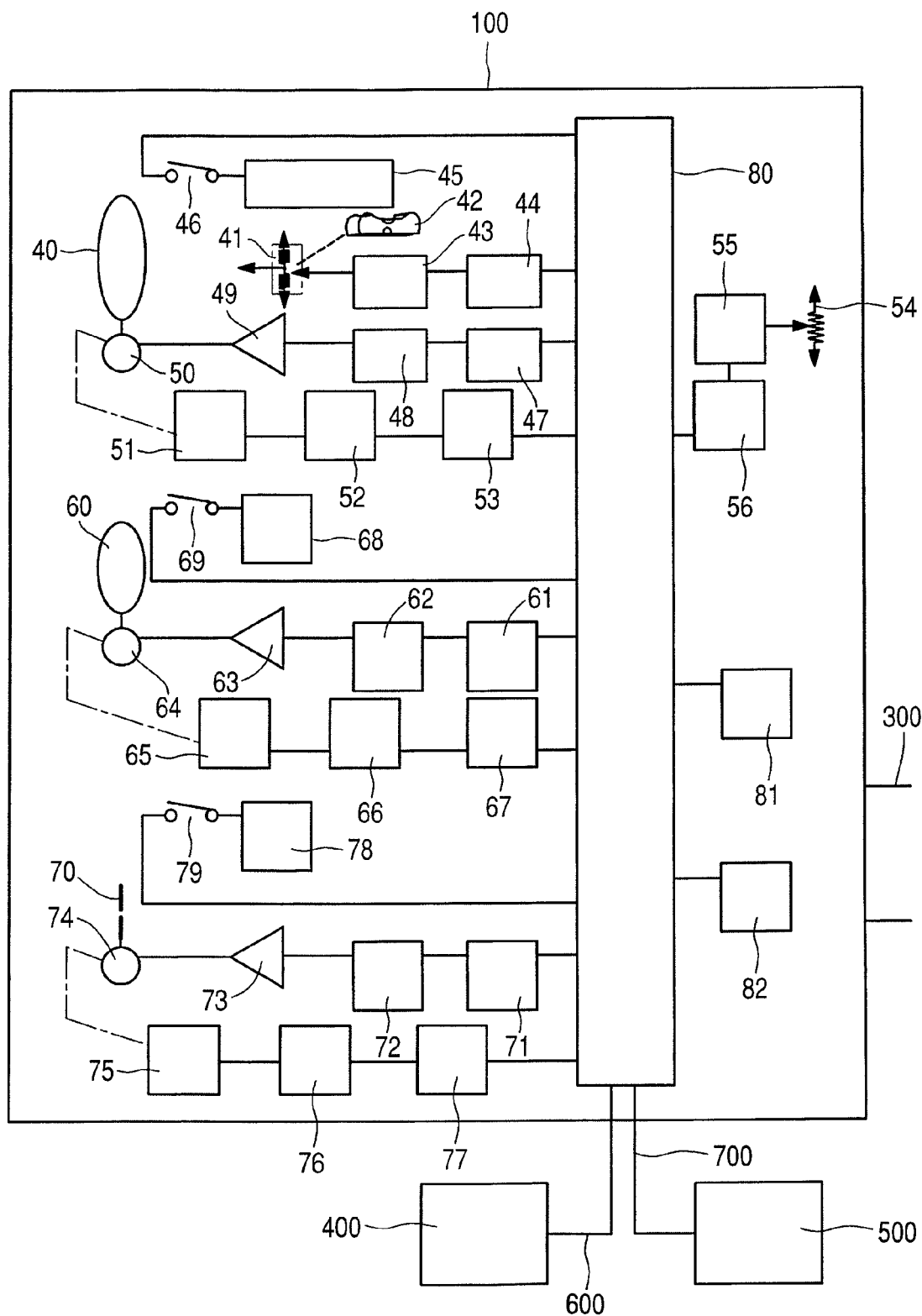
FIG. 2 is a block diagram illustrating the structure of a television lens portion.

FIG. 2 is a block diagram illustrating the television lens portion 100. The television lens portion 100 includes a zoom lens optical system 40, a focus lens optical system 60, and an iris mechanism 70 which are controlled by a central processing unit (CPU) 80.

A zoom speed command signal generation unit 41 for driving the zoom lens optical system 40 that performs variable adjustment has an analog detector such as a potentiometer or a variable gain controller and a digital detector such as a rotary encoder.

The zoom speed command signal generation unit 41 outputs a zoom speed command signal indicating a zoom drive direction and a zoom drive speed which correspond to an operation amount of a zoom switch 42 for electrical driving. The zoom speed command signal from the zoom speed command signal generation unit 41 is supplied to the CPU 80 through a zoom speed operation signal calculation unit 43 and an A/D conversion unit 44.

The output of a zoom clutch 46 operated by a zoom ring 45 is connected with the CPU 80. A zoom control signal from the CPU 80 is supplied to a zoom motor 50 for driving the zoom lens optical system 40 through a D/A conversion unit 47, a zoom control signal calculation unit 48, and a zoom power amplifying unit 49.

A zoom reference position detection unit 51 detects a zoom reference position signal indicating an absolute position of the zoom lens optical system 40. The output of the zoom reference position detection unit 51 is connected with the CPU 80 through a zoom reference position calculation unit 52 and an A/D conversion unit 53.

The output of a zoom switch speed variable gain controller 54 is connected with the CPU 80 through a variable gain position calculation unit 55 and an input conversion unit 56.

A focus control signal from the CPU 80 is supplied to a focus motor 64 through a D/A conversion unit 61, a focus control signal calculation unit 62, and a focus power amplifying unit 63. The focus lens optical system 60 is driven by the focus motor 64 controlled based on the focus control signal from the CPU 80.

A focus reference position detection unit 65 outputs a focus reference position signal indicating an absolute position of the focus lens optical system 60. The focus reference position detection unit 65 is connected with the CPU 80 through a focus reference position calculation unit 66 and an A/D conversion unit 67.

The output of a focus clutch 69 operated by a focus ring 68 is connected with the CPU 80.

In the iris mechanism 70 for light amount adjustment of the optical apparatus, an iris control signal from the CPU 80 is supplied to an iris motor 74 through a D/A conversion unit 71, an iris control signal calculation unit 72, and an iris power amplifying unit 73. The output of an iris reference position detection unit 75 is connected with the CPU 80 through an iris reference position calculation unit 76 and an A/D conversion unit 77. An output of an iris ring 78 is connected with the CPU 80 through an iris electrical/manual drive change switch 79.

The CPU 80 is connected with a lens information display portion 81 for displaying various operation states of the television lens portion 100 and a nonvolatile memory portion 82 for storing various items of information.

Figure 3:
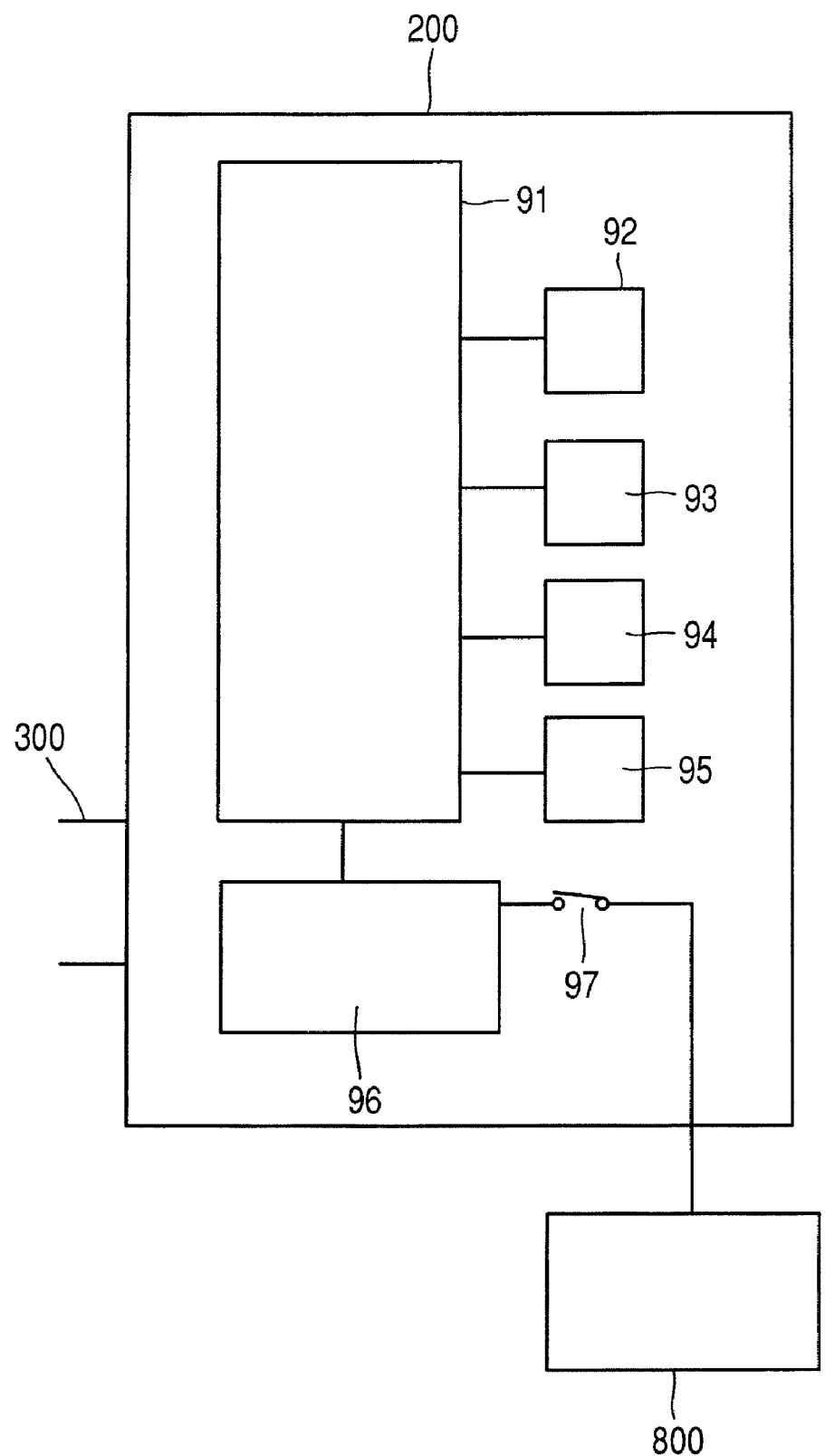
FIG. 3 is a block diagram illustrating the structure of a television camera portion.

FIG. 3 is a block diagram illustrating a structure of the television camera portion 200. In the television camera portion 200, a CPU 91 is connected to a charge-coupled device (CCD) 92 serving as an image pickup device, a video signal processing portion 93, a video signal recording and reproducing portion 94, a video signal display portion 95, and a reference voltage generation portion 96.

The CCD 92 converts an optical signal inputted from the television lens portion 100 into an electrical signal to obtain a video signal.

The video signal processing portion 93 processes the output of the CCD 92.

The video signal recording and reproducing portion 94 records and reproduces the video signal processed by the video signal processing portion 93.

The video signal display portion 95 displays various operation states of the television camera portion 200 and a picked-up video image. The reference voltage generating portion 96 generates a reference voltage based on a power supply voltage supplied from the power supply portion 800 through a power supply switch portion 97.

Figure 4:
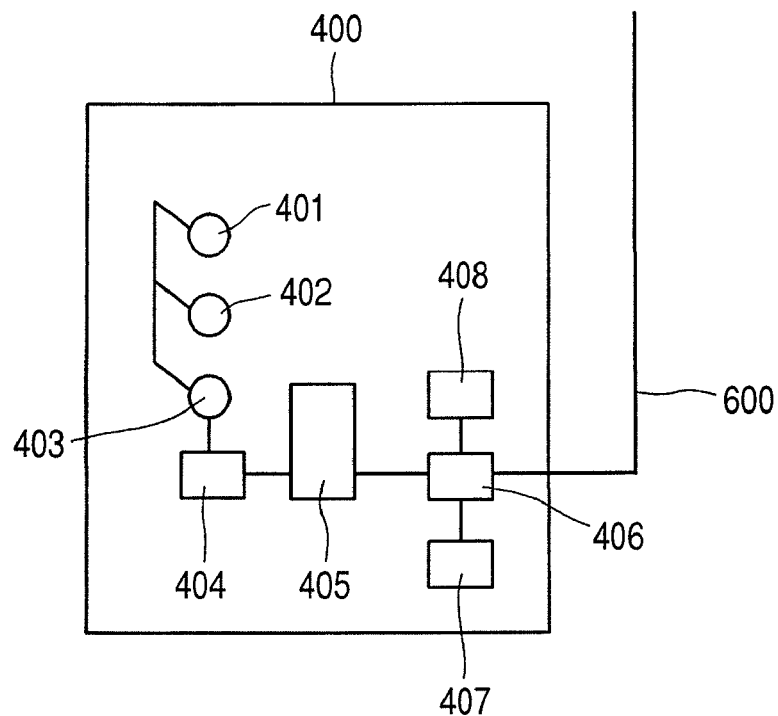
FIG. 4 is a block diagram illustrating the structure of a zoom demand portion.

FIG. 4 is a block diagram illustrating a structure of the zoom demand portion 400. An output of the zoom demand portion 400 is used to control the zoom lens optical system 400 through the CPU 80 of the television lens portion 100. The zoom demand portion 400 includes a zoom demand operation portion 401 which has an analog detector such as a potentiometer or a variable gain controller.

A zoom demand relative position detection unit 402 and a zoom demand reference position detection unit 403 are provided adjacent to the zoom demand operation portion 401. Signals from the zoom demand relative position detection unit 402 and the zoom demand reference position detection unit 403 are supplied to a CPU 406 through a zoom demand reference position calculation unit 404 and an A/D conversion unit 405.

The zoom demand relative position detection unit 402 includes a digital detector such as a rotary encoder, for detecting the value of a rotation angle of the zoom demand operation portion 401. The zoom demand reference position detection unit 403 includes an optical reflecting plate for detecting a reference position of the zoom demand relative position detection unit 402.

The CPU 406 calculates one of a position control value and a speed control value which corresponds to the rotation angle of the zoom demand operation portion 401 and outputs the calculated control value to the CPU 80 of the television lens portion 100.

The CPU 406 is connected with a nonvolatile memory portion 407 for storing said one of the position control value and the speed control value which corresponds to the rotation angle of the zoom demand operation portion 401. The CPU 406 is further connected with a nonvolatile memory portion 408 for storing, for example, the absolute position of the zoom demand reference position detection unit 403 relative to the zoom demand relative position detection unit 402.

Figure 5:
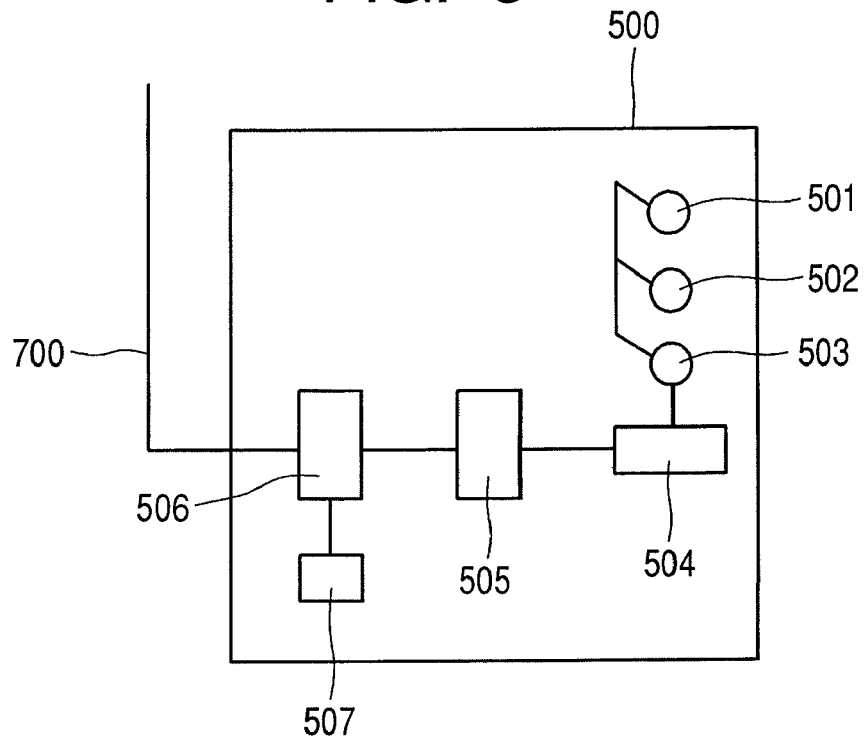
FIG. 5 is a block diagram illustrating the structure of a focus demand portion.

FIG. 5 is a block diagram illustrating the focus demand portion 500. A focus demand operation portion 501 for controlling the focus lens optical system 60 of the television lens portion 100 includes an analog detector such as a potentiometer or a variable gain controller. An output of the operation portion 501 is connected to a focus demand relative position detection unit 502 and a focus demand reference position detection unit 503. The focus demand relative position detection unit 502 and the focus demand reference position detection unit 503 are connected to a CPU 506 through a focus demand reference position calculation unit 504 and an A/D conversion unit 505.

The CPU 506 is connected to a nonvolatile memory portion 507 for storing data used to calculate one of a position control value and a speed control value which corresponds to a rotation angle of the focus demand operation portion 501.

The CPU 506 calculates the one of the position control value and the speed control value which corresponds to the rotation angle of the focus demand operation portion 501, and outputs the calculated control value to the CPU 80 of the television lens portion 100.

When the zoom switch 42 provided around the lens barrel of the television lens portion 100 is operated, the zoom speed command signal indicating the zoom drive direction and the zoom drive speed of the zoom lens optical system 40 which correspond to the operation amount of the zoom switch 42 is output from the zoom speed command signal generation unit 41.

The zoom speed operation signal calculation unit 43 performs signal level conversion and signal shift conversion on the zoom speed command signal. The zoom speed command signal is converted into a digital signal by the A/D conversion unit 44 and then sent to the CPU 80.

The zoom control signal output from the CPU 80 is converted into an analog signal by the D/A conversion unit 47. The zoom control signal calculation unit 48 performs signal level conversion and signal shift conversion on the zoom control signal. The zoom motor 50 is driven based on the converted zoom control signal through the zoom power amplifying unit 49.

A zoom reference position of the zoom lens optical system 40 driven by the zoom motor 50 is detected by the zoom reference position detection unit 51. A position signal indicating the detected zoom reference position is sent to the CPU 80 through the zoom reference position calculation unit 52 and the A/D conversion unit 53.

The zoom demand portion 400 outputs a control signal for driving the zoom lens optical system 40 based on the rotation of the zoom demand operation portion 401.

The zoom demand relative position detection unit 402 provided adjacent to the zoom demand operation portion 401 includes a digital detector such as a rotary encoder, for detecting a rotational operation amount of the zoom demand operation portion 401.

The zoom demand reference position detection unit 403 provided adjacent to the zoom demand operation portion 401 includes, for example, an optical reflecting plate. When the zoom demand operation portion 401 passes through a reference position of the zoom demand reference position detection unit 403, the reference position is detected and the detected reference position is associated with a counted value (relative position) of the rotary encoder.

The rotational operation amount of the zoom demand operation portion 401 is calculated in advance based on an offset amount of the reference position which is stored in the nonvolatile memory portion 408, that is, a shift amount of the reference position which is caused by the placement of the zoom demand reference position detection unit 403.

The CPU 406 provided in an inner portion of the zoom demand portion 400 outputs, to the television lens portion 100, one of a position control signal and a speed control signal of the zoom lens optical system 40 based on the rotational operation amount of the zoom demand operation portion 401.

The drive control of the zoom lens optical system 40 which is performed by the zoom switch 42 and the zoom demand portion 400 is described.

The same drive control is performed on the focus lens optical system 60 and the iris mechanism 70 in the television lens portion 100.

The focus motor 64 is driven by the operation of the focus ring 68. The CPU 506 of the focus demand portion 500 outputs, to the television lens portion 100, one of the position control signal and the speed control signal to the television lens portion 100 based on the operation of the focus demand operation portion 501 of the focus demand portion 500.

The iris motor 74 is driven by the operation of the iris ring 78. The iris reference position detection unit 75 outputs an iris position signal indicating a position of the iris mechanism 70.

Figure 6:
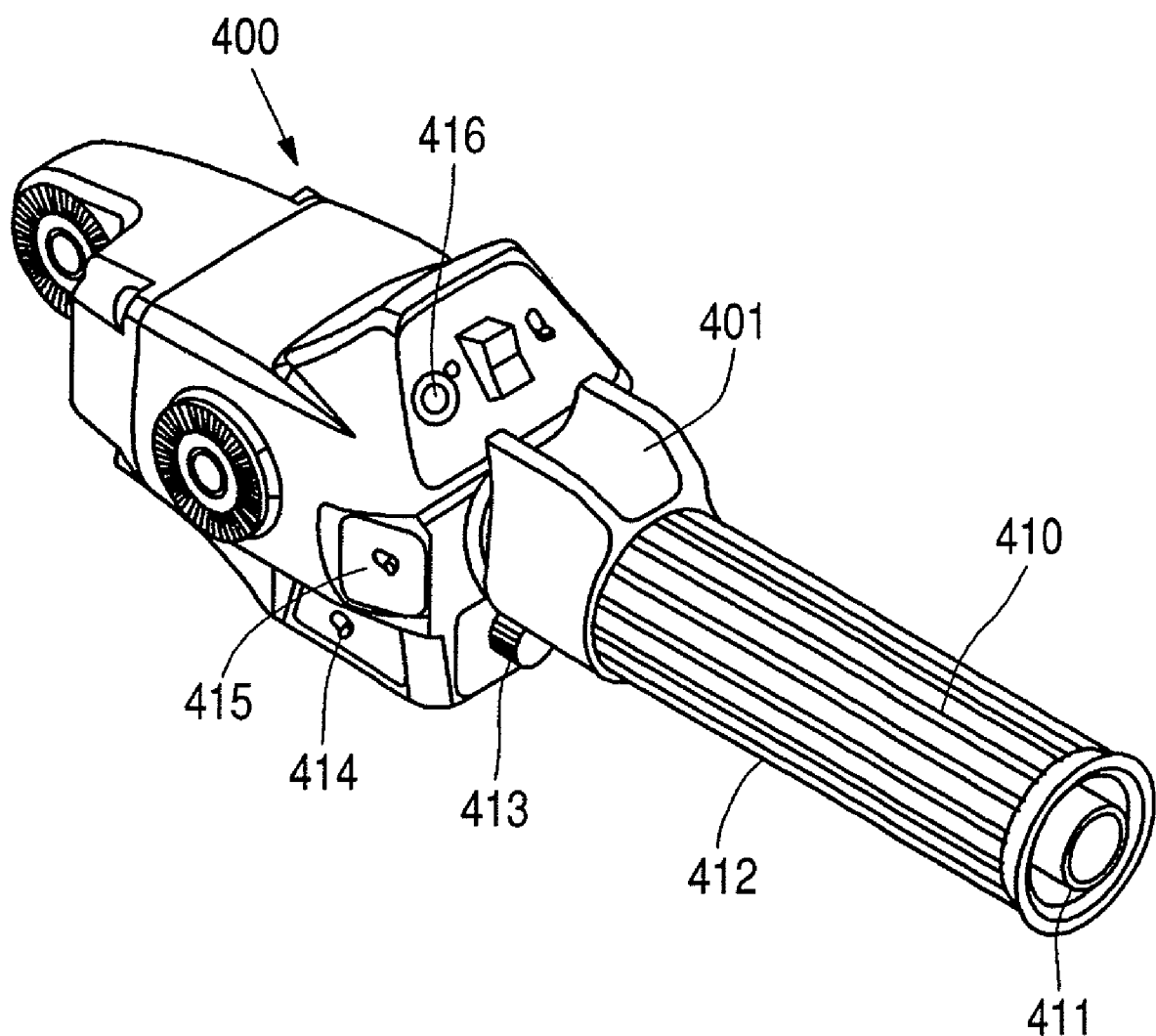
FIG. 6 is a perspective view illustrating the zoom demand portion.

FIG. 6 is a perspective view illustrating the zoom demand portion 400. The resistance to applied torque provided by the zoom demand operation portion 401 can be changed by the operation of a torque adjustment portion (thumb ring) 411 provided at an end of a grip portion 410.

A video signal to be displayed on the video signal display portion 95 of the television camera portion 200 is set by the operation of a return switch portion 412.

A drive speed of the zoom lens optical system 40 which corresponds to the rotational operation amount of the zoom demand operation portion 401 is adjusted by the operation of a zoom speed adjustment portion 413.

A drive range of the zoom lens optical system 40 is set by the operation of a zoom track setting portion 414. A so-called shuttle shot function for moving the zoom lens optical system 40 to a predetermined position at maximum speed is set by the operation of a zoom shot setting portion 415. For example, a midpoint position is set by the operation of a various-function setting portion 416.

Figure 7A:
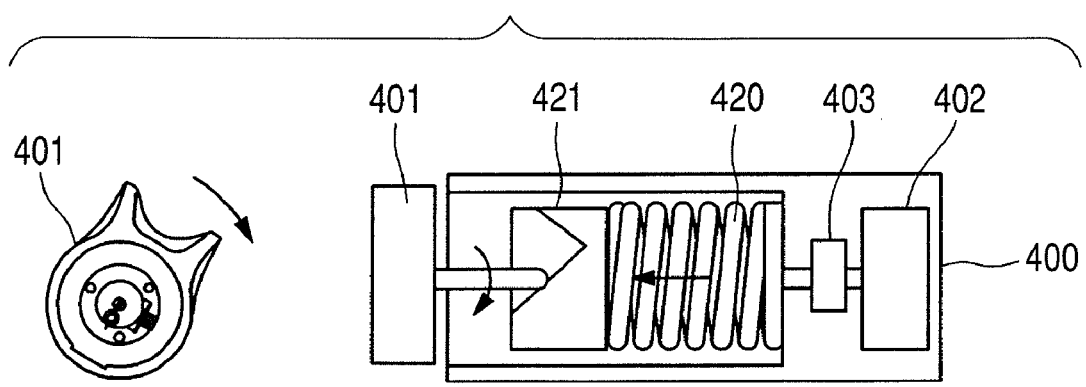
FIGS. 7A, 7B and 7C are explanatory diagrams illustrating an operation of the zoom demand portion.
Figure 7B:
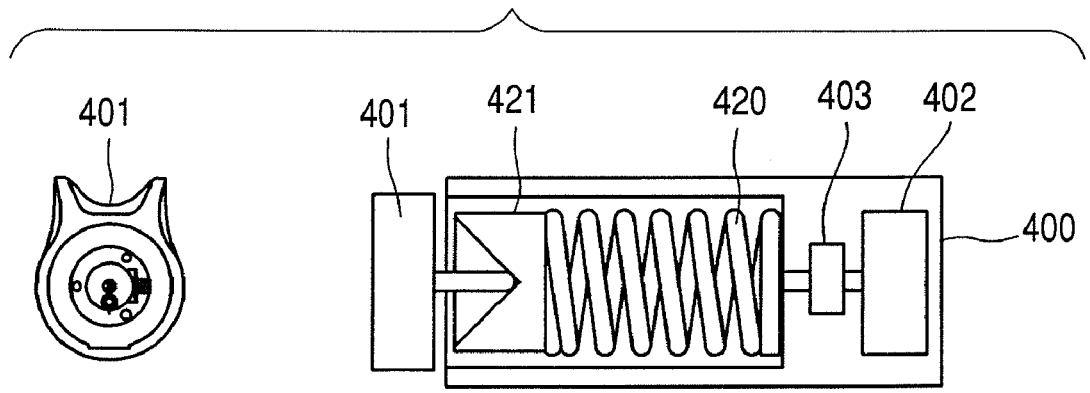
Figure 7C:
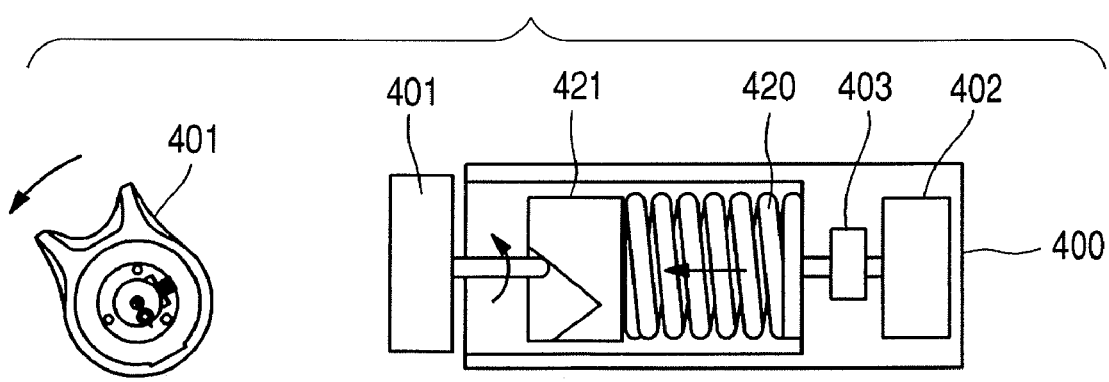

FIGS. 7A to 7C are explanatory views illustrating the operation of the zoom demand portion 400.

FIG. 7A illustrates a state in which the zoom demand operation portion 401 is rotated clockwise. FIG. 7B illustrates a state in which the zoom demand operation portion 401 is stopped at the midpoint. FIG. 7C illustrates a state in which the zoom demand operation portion 401 is rotated counter-clockwise.

The zoom demand portion 400 includes a spring member 420 and an operation force conversion portion 421 for converting the rotational operation amount of the zoom demand operation portion 401 into an expansion/contraction amount of the spring member 420. Therefore, when the zoom demand operation portion 401 is rotated clockwise from the midpoint position to the vicinity of an clockwise end thereof (by approximately 90 degrees) or rotated counterclockwise to the vicinity of a counterclockwise end thereof (by approximately 90 degrees) and then released from the hand, the oscillation of the zoom demand operation portion 401 is attenuated by the action of the spring member 420 and then stopped at the midpoint position.

The rotational center axis of the zoom demand operation portion 401 is connected with the zoom demand relative position detection unit 402 and the zoom demand reference position detection unit 403.

Figure 8:
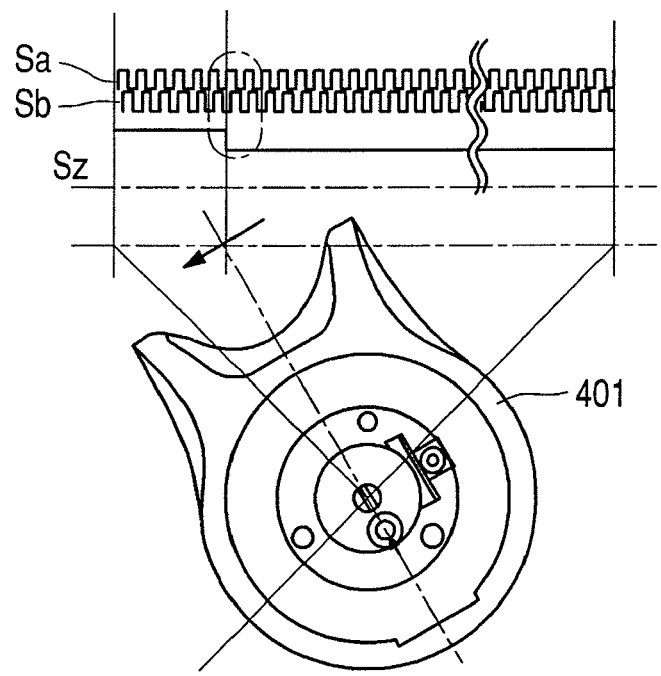
FIG. 8 is an explanatory diagram illustrating output signals from a relative position detection unit and a reference position detection unit.

FIG. 8 is an explanatory view illustrating position detection signals in the case where the zoom demand operation portion 401 is rotated. With the rotation of the zoom demand operation portion 401, an A-phase signal Sa and a B-phase signal Sb are output from the zoom demand relative position detection unit 402. A Z-phase signal Sz is output from the zoom demand reference position detection unit 403. The output signals are inputted to the CPU 406.

After the zoom demand portion 400 is powered on, a camera operator starts to operate the zoom demand operation portion 401.

Phases of the A-phase signal Sa and the B-phase signal Sb from the zoom demand relative position detection unit 402 at the time when the zoom demand operation portion 401 passes through a detection position (phase change position of Z-phase) of the zoom demand reference position detection unit 403 correspond to a relative position at the time of passing through the reference position and are associated with the reference position.

When the relative positions at the time of passing through the reference position and a placement (offset amount) of the detection position of the zoom demand reference position detection unit 403 which is stored in advance in the nonvolatile memory portion 408 are used, the rotational operation amount of the zoom demand operation portion 401 can be calculated.

Figure 9:
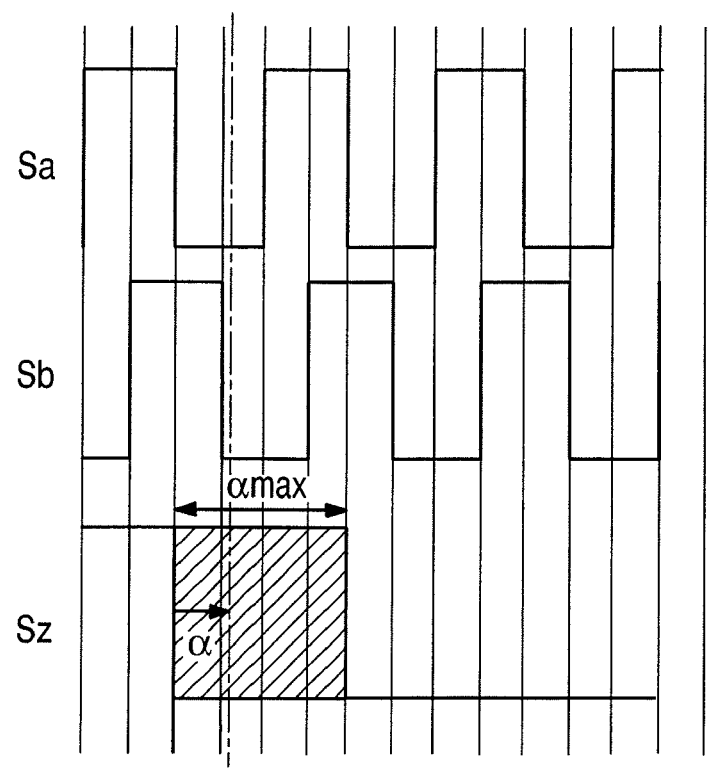
FIG. 9 is an enlarged waveform diagram illustrating an A-phase signal, a B-phase signal, and a Z-phase signal.

FIG. 9 is an enlarged waveform diagram illustrating the A-phase signal Sa, the B-phase signal Sb, and the Z-phase signal Sz which are output from the position detection units 402 and 403.

The A-phase signal Sa, the B-phase signal Sb, and the Z-phase signal Sz are obtained by a known optical encoder disclosed in, for example, Japanese Patent Application Laid-Open No. 2005-291980 or Japanese Patent Application Laid-Open No. 2006-214929 and thus a detailed description is omitted here. In the case where the zoom demand operation portion 401 is operated at high speed, when the phase change position (reference position) of the Z-phase is associated with the A-phase signal Sa and the B-phase signal Sb, a phase delay α is caused by a characteristic of a detector such as a photodiode. The phase delay α increases proportionally with the operation speed of the zoom demand operation portion 401 and the temperature. As a result, when the phase delay exceeds a permissible phase delay αmax, a fault condition of the zoom lens optical system 40 occurs. When the rising edge of the A-phase signal Sa immediately after the detection of the Z-phase signal Sz is set as the reference position, the permissible phase delay αmax is 360°.

When the zoom demand operation portion 401 is operated at high speed, it is likely to cause a phase shift (phase delay) value α in the Z-phase signal Sz. The phase delay value α has a characteristic which is proportional to the operation speed of the zoom demand operation portion 401. The maximum permissible phase shift (phase delay) value αmax is a limit value of the phase shift after which the fault condition of the zoom lens optical system 40 occurs.

When the falling edge of the A-phase signal Sa immediately after the detection of the Z-phase signal Sz is set as an original reference position, the maximum permissible phase shift value is 360°.

With respect to the relationship between the operation angle of the zoom demand operation portion 401 and the zoom control value, when processing is performed such that CPU 406 does not output the control signal in the case where the operation angle is equal to or smaller than a predetermined angle, a dead zone can be set. The maximum permissible phase shift value αmax can be changed based on the set value for the dead zone. A maximum permissible rotation speed Vαmax for phase shift is an operation speed at a time when the maximum permissible phase shift value αmax is obtained.

Figure 10:
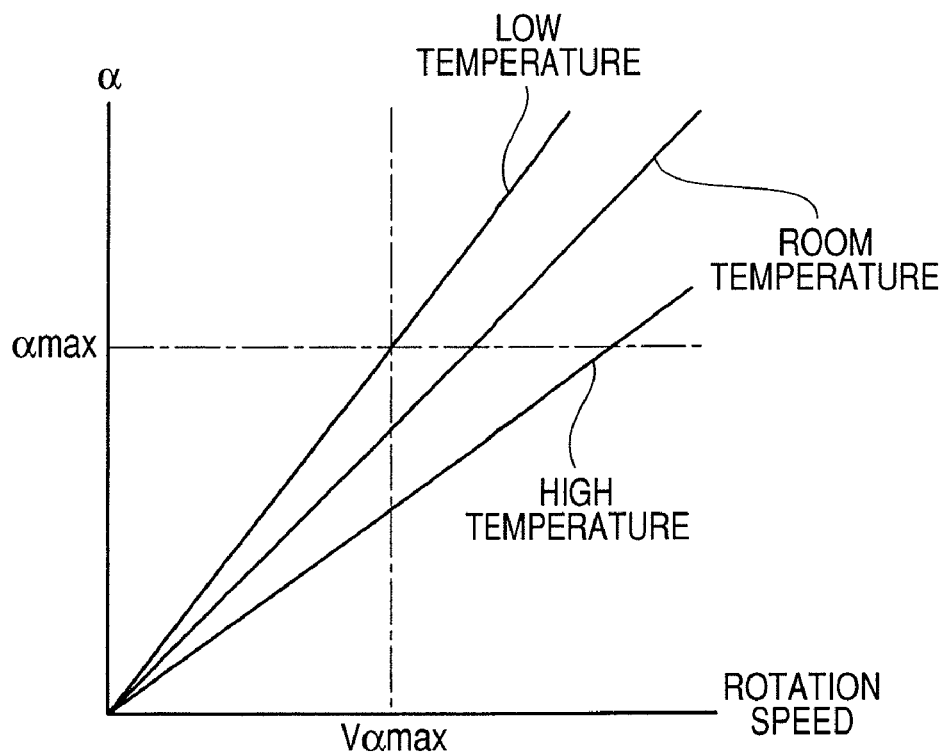
FIG. 10 is a graph illustrating a rotation speed and a phase delay a of a zoom demand operation portion.

FIG. 10 is a graph illustrating a relationship between the rotation speed and the phase delay α of the zoom demand operation portion 401. FIG. 10 illustrates cases of a high-temperature, a room temperature, and a low temperature (guaranteed minimum temperature). The phase delay α becomes larger as the temperature reduces. Therefore, the rotation speed corresponding to the permissible phase delay αmax at the guaranteed minimum temperature becomes the permissible rotation speed Vαmax.

Figure 11A:
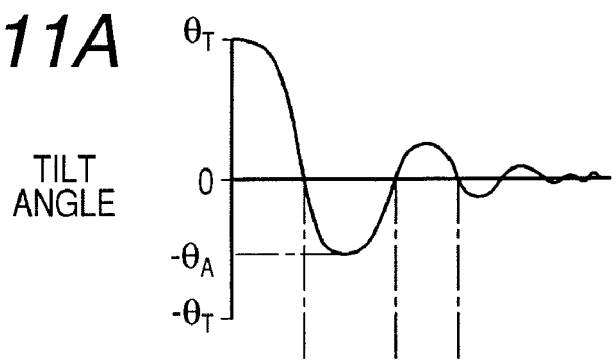
FIGS. 11A and 11B are explanatory diagrams illustrating an operation in the case where the zoom demand operation portion is released at a clockwise end.
Figure 11B:
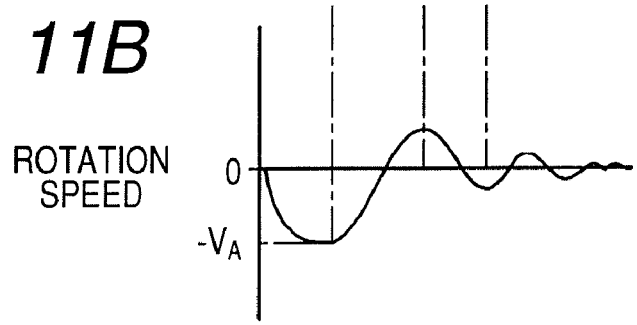

FIGS. 11A and 11B are graph illustrating operation traces after the zoom demand operation portion 401 is released at the clockwise end.

The ordinates indicate (a) a tilt angle and (b) a rotation angle and the abscissa indicates a time of the zoom demand operation portion 401. An oscillation at a clockwise end $\theta_T$ serving as a start point is attenuated by the action of the spring member 420, so that a phase difference of approximately 90° is caused between the rotation angle and the rotation speed of the zoom demand operation portion 401.

FIGS. 12A and 12B illustrate operation traces after the zoom demand operation portion 401 is released at the counterclockwise end as in the case of FIGS. 11A and 11B.

FIGS. 13A and 13B illustrate operation traces in the case where the zoom demand operation portion 401 is forcibly operated from the hand at the clockwise end to perform a high-speed operation.

Figure 14A:
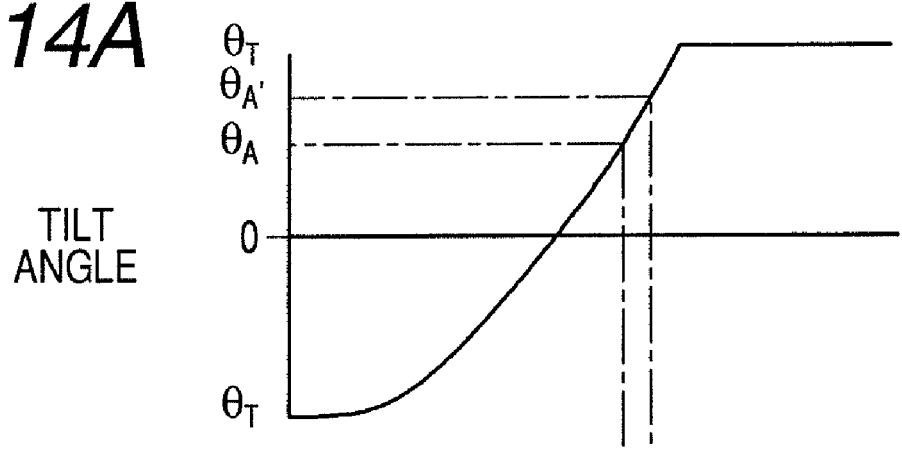
FIGS. 14A and 14B are explanatory diagrams illustrating an operation in the case where the zoom demand operation portion is forcibly operated by the hand at the counterclockwise end.
Figure 14B:
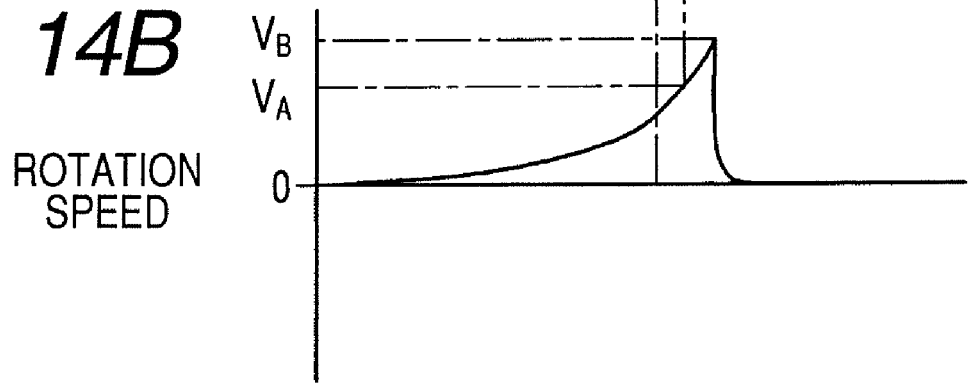

FIGS. 14A and 14B illustrate operation traces in the case where the zoom demand operation portion 401 is forcibly operated at the counterclockwise end to perform a high-speed operation as in the case of FIGS. 13A and 13B.

In the case where any of the operations as illustrated in FIGS. 11A and 14B is performed, when the rotation speed of the zoom demand operation portion 401 is equal to or slower than the maximum permissible rotation speed V$\alpha$max which is a threshold speed, the fault condition caused by the phase delay $\alpha$ can be prevented and high-precision operability can be realized. Therefore, when the zoom demand reference position detection unit 403 is located between angles θA and θA', the rotation speed of the zoom demand operation portion 401 can be made equal to or slower than the maximum permissible rotation speed V$\alpha$max. As a result, the fault condition caused by the phase delay $\alpha$ can be prevented.

Embodiment 2

Figure 15:
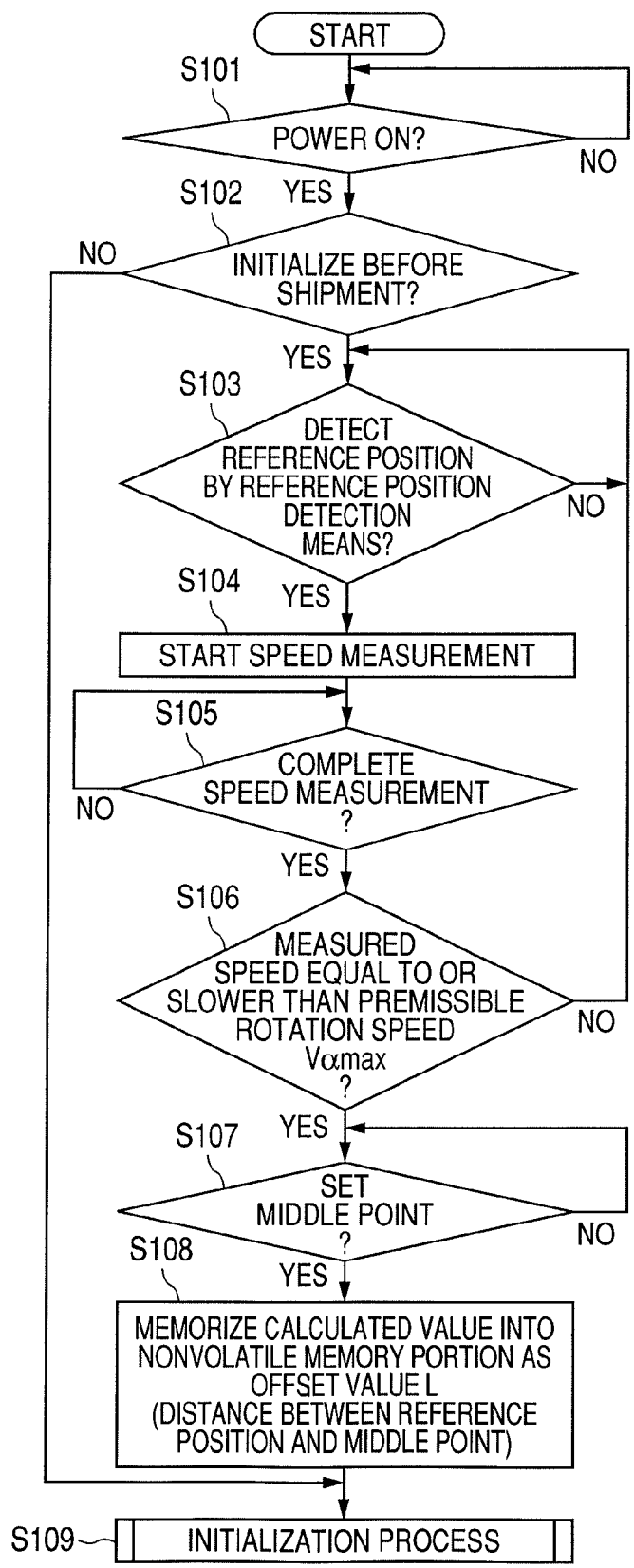
FIG. 15 is a flowchart illustrating an initialization process at a factory in Embodiment 2.

FIG. 15 is a flowchart illustrating a procedure for setting the reference position and the offset value of the zoom demand relative position detection unit 402 in Embodiment 2.

Step S101 is a power-on checking step. When a power supply is turned on, processing goes to Step S102.

When the power supply is not turned on, the checking step of Step S101 is repeated.

Figure 16:
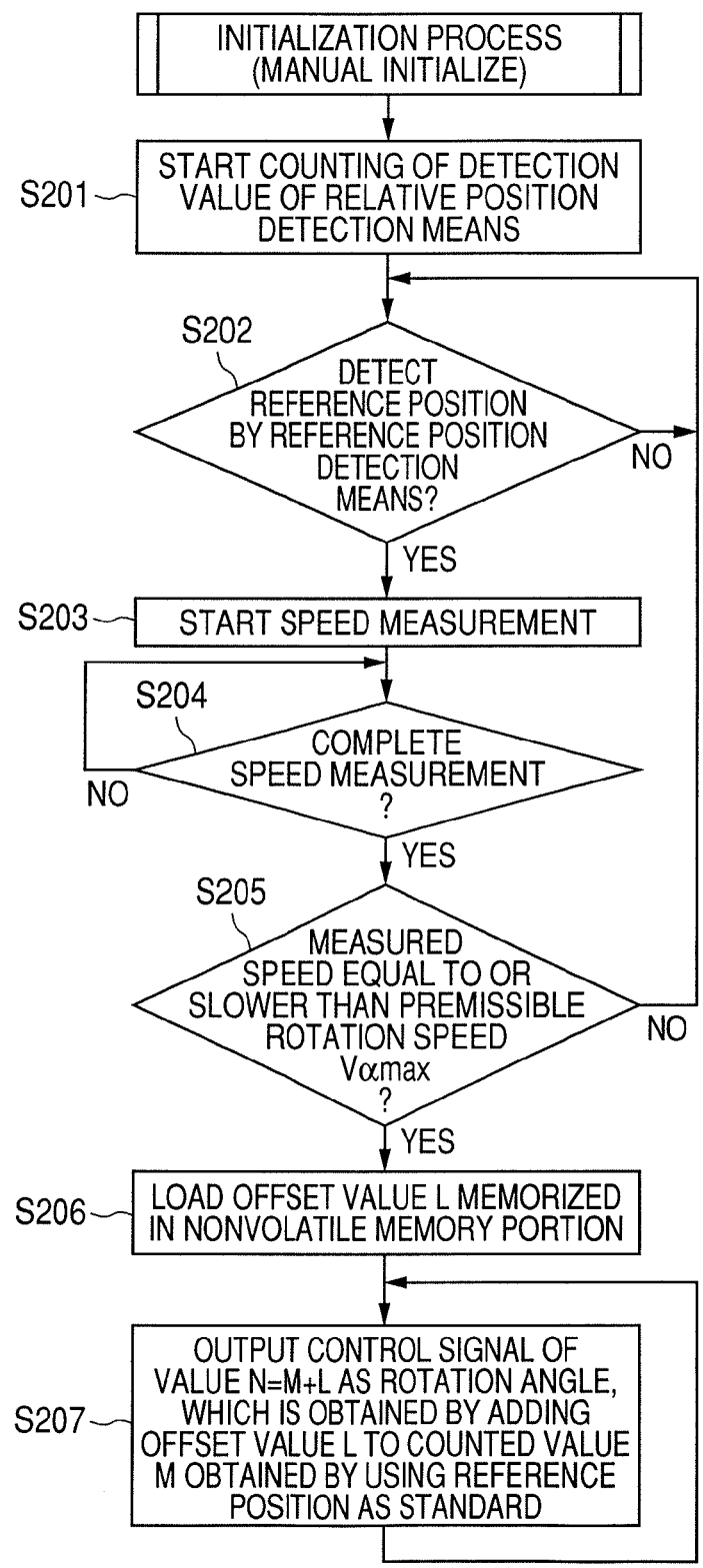
FIG. 16 is a flowchart illustrating a manual initialization process in Embodiment 2.

Step S102 is a step of checking setting at a factory. When an initialization setting is performed, processing goes to Step S103. When the initialization setting is not performed, processing goes to a processing procedure for activation as illustrated in FIG. 16 through Step S109.

Step S103 is a step of checking whether or not the reference position is detected by the zoom demand reference position detection unit 403. When the reference position is detected, processing goes to Step S104. If the reference position is not detected, the checking step of Step S103 is repeated.

In Step S104, the output of the zoom demand relative position detection unit 402 is counted to start speed measurement. Then, processing goes to Step S105.

In Step S105, the CPU 406 obtains a counted value of a timer to check whether or not the speed measurement is completed. When the speed measurement is not completed, the checking step of Step S105 is repeated.

In Step S106, whether or not a measured speed is equal to or slower than the permissible rotation speed V$\alpha$max for phase delay is determined. If the measured speed is equal to or slower than the permissible rotation speed V$\alpha$max, processing goes to Step S107. When the measured speed is faster than the permissible rotation speed V$\alpha$max, processing returns to Step S103 to perform the speed measurement again.

In Step S107, whether or not the midpoint setting is turned on by the various-function setting portion 416 of the zoom demand operation portion 401 is checked. When the midpoint setting is turned on, processing goes to Step S108. When the midpoint setting is not turned on, the checking step of Step S107 is repeated.

In Step S108, the distance between the midpoint and the reference position is stored as an offset value L in the nonvolatile memory portion 408. Then, processing goes to the manual initialization processing procedure illustrated in FIG. 16 through Step S109.

FIG. 16 is a flowchart illustrating the initialization processing procedure (reference position setting method) for the zoom demand portion 400 in the case where the lens device (television lens portion) is powered on (for example, after shipment to a user).

In Step S201, the counting of the output of the zoom demand relative position detection unit 402 starts.

Step S202 is a step of checking whether or not the reference position is detected by the zoom demand reference position detection unit 403. When the reference position is detected, processing goes to Step S203. When the reference position is not detected, the checking step of Step S202 is repeated.

In Step S203, the output of the zoom demand relative position detection unit 402 is counted to start the speed measurement. Then, processing goes to Step S204.

Step S204 is a step of checking whether or not the speed measurement is completed. When the speed measurement is not completed, the checking step of Step S204 is repeated. When the speed measurement is completed, processing goes to Step S205.

In Step S205, a measured speed is compared with the permissible rotation speed V$\alpha$max. When the measured speed is equal to or slower than the permissible rotation speed V$\alpha$max, processing goes to Step S206. When the measured speed is faster than the permissible rotation speed V$\alpha$max, processing returns to Step S202 to perform the speed measurement again.

In Step S206, the offset value L stored in the nonvolatile memory portion 408 is loaded. Then, processing goes to Step S207.

In Step S207, a control signal indicating a value N (=M+L) corresponding to the rotation angle of the zoom demand operation portion 401 is output. The value N is obtained by adding the offset value L to a counted value M for the zoom demand relative position detection unit 402 which is obtained based on the reference position. Step S207 is repeated to execute normal processing.

Embodiment 3

Figure 17:
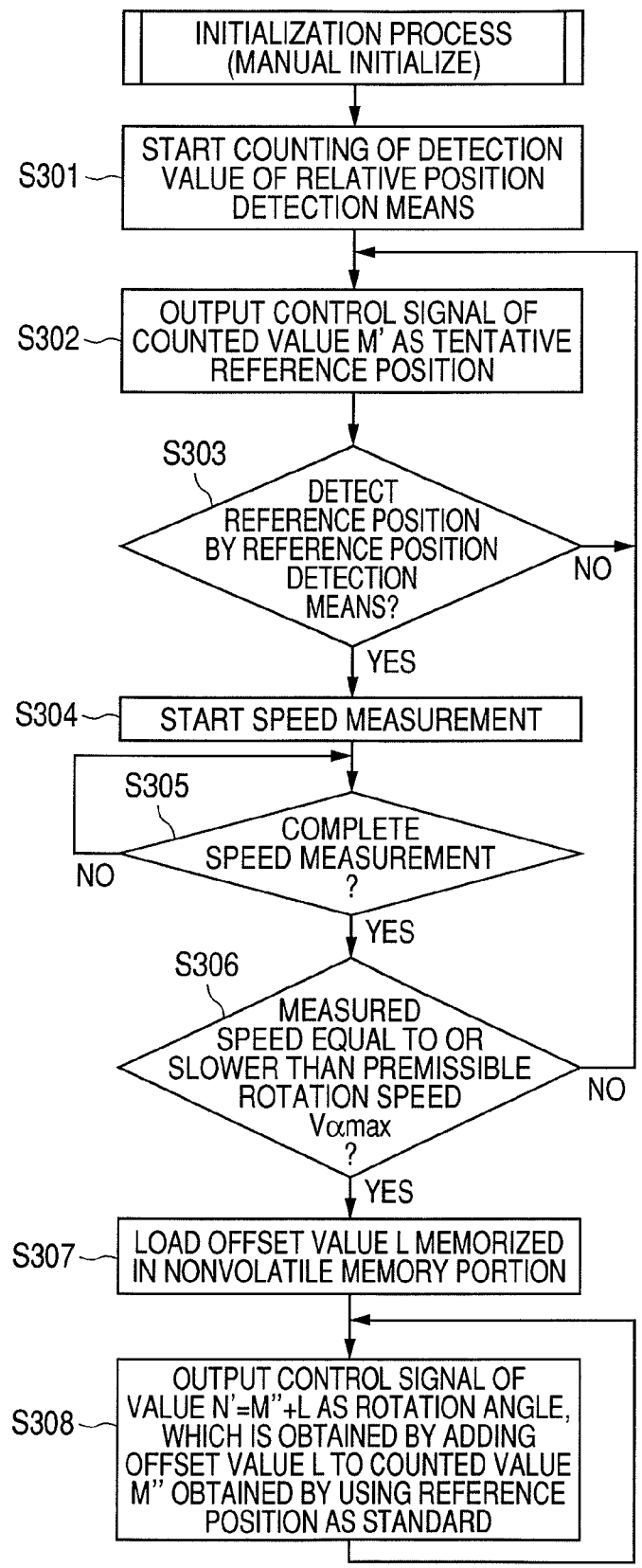
FIG. 17 is a flowchart illustrating an automatic initialization process in Embodiment 3.

FIG. 17 is a flowchart illustrating an initialization processing procedure for activation in Embodiment 3 of the present invention to semi-automatically detect the reference position, which is different from the above-mentioned initialization processing procedure for activation.

In Step S301, the counting of the output of the zoom demand relative position detection unit 402 starts.

In Step S302, The rotational operation amount of the zoom demand operation portion 401 is calculated based on a relative position at the time of turning the power on (counted value M' for the zoom demand relative position detection unit 402) and a predetermined reference position (offset value L) to output a control signal.

Step S303 is a step of checking whether or not the reference position is detected by the zoom demand reference position detection unit 403. When the reference position is detected, processing goes to Step S304. When the reference position is not detected, processing returns to Step S302.

In Step S304, the output of the zoom demand relative position detection unit 402 is counted to start the speed measurement. Then, processing goes to Step S305.

In Step S305, the CPU 406 checks a counted value of the timer to determine whether or not the speed measurement is completed. When the speed measurement is not completed, the checking step of Step S305 is repeated. When the speed measurement is completed, processing goes to Step S306.

In Step S306, whether or not a measured speed is equal to or slower than the permissible rotation speed Vαmax is checked. When the measured speed is equal to or slower than the permissible rotation speed Vαmax, processing goes to Step S307. When the measured speed is faster than the permissible rotation speed Vαmax, processing returns to Step S302 to perform the speed measurement again.

In Step S307, the offset value L stored in advance in the nonvolatile memory portion 408 is read in the initialization processing procedure.

In Step S308, a control signal indicating a value N' (=M"+ L) corresponding to the rotation angle of the zoom demand operation portion 401 is output. The value N' is obtained by adding the offset value L to a counted value M" obtained by using the reference position as a standard. After that, Step S308 is repeated to execute normal processing.

In this embodiment, the offset value L stored in the nonvolatile memory portion 408 is one. However, multiple offset values corresponding to results obtained by speed measurement may be set.

When a result (speed) obtained by speed measurement immediately after the power is turned on is the slowest, update is performed using an offset value corresponding to the speed. The same processing is repeated until a speed at which little phase delay occurs is finally measured. According to the update processing of the offset value L, the control signal can be output immediately after the power is turned on and the output precision of an operation device can be improved as needed.

When the phase delay is caused by a low-temperature environment, the same processing may be performed using an additional temperature sensor. When the offset value L is selected based on a result obtained by the temperature sensor, the precision of the phase delay of the zoom demand reference position detection unit 403 relative to the zoom demand relative position detection unit 402 can be improved.

In this embodiment, the case is described where the reference position of the operation portion or moveable input member such as the zoom demand portion of the operation device is detected and the control signal obtained based on the reference position and the relative position is output to the lens device. The reference position setting method can be applied to the case where not only the reference position of the operation portion of the operation device is detected but also to reference positions of a focus lens and a zoom lens which are included in the lens device are detected and lens position signals obtained based on the reference positions and relative positions are output to an external device such as a camera.

Embodiment 4

In Embodiment 4, the reference position to be detected, of the zoom reference position detection unit 51 is set close to a moving end of an optical element. When the lens device (lens television lens portion) 100 is powered off, a lens is automatically moved between the moving end of the optical element and a detected position of the zoom reference position detection unit 51.

When the lens is moved at the time of turning the power on to the lens device 100, a moving speed of the optical element at the time of passing through the reference position, that is, the moving speed thereof immediately after the lens starts to move is slow because of the inertia of the optical element. Therefore, the moving speed becomes equal to or slower than the permissible moving (rotation) speed Vαmax.

When first reference position detection is performed after turning on the power of the lens device 100 based on the above-mentioned fact, the phase delay α can be suppressed to the permissible phase delay αmax or less.

Multiple zoom reference position detection units, each of which is the same as the zoom reference position detection unit 51, may be arranged close to each other. Then, each lens may be automatically moved between adjacent zoom reference position detection units 51 at the time of turning the power off.

In the case where the moving speed at the time of passing through the reference position after turning on the power of the lens device 100 is equal to or slower than Vαmax, and when the first reference position detection is performed after the power is turned on of the lens device 100, the phase delay α can be suppressed to the permissible phase delay αmax or less.

In the above-mentioned embodiments, the case of the zoom lens optical system 40 is described. The same can be applied to another drive device for the focus lens optical system 60 or the iris mechanism 70.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-275072, filed Oct. 6, 2006, which is hereby incorporated by reference herein in its entirety.

What is claimed is:

1. An operation device for outputting a control signal for controlling an optical element of an optical apparatus, comprising:
   a movable input member operated by an operator;
   a reference position detector unit for detecting that the movable input member passes through a reference position;
   a relative position detector unit for detecting a relative position of the movable input member; and
   a controller configured to calculate and output the control signal, after the device is powered on and the movable input member has passed through the reference position with an operation speed which is equal to or slower than a threshold speed, based on a reference position detection result obtained by the reference position detector unit and a relative position detection result obtained by the relative position detector unit,
   wherein the threshold speed is slower than a maximum operation speed of the movable input member.

2. A device according to claim 1, wherein the control signal is output while a predetermined reference position is associated with a relative position at a time when the device is powered on until the operation speed of the movable input member at the time when the reference position is detected becomes equal to or slower than the threshold speed.

3. A device according to claim 2, further comprising a memory for storing multiple reference positions corresponding to multiple operation speeds of the movable input member,
   wherein when the operation speed of the movable input member at the time when the reference position is detected is minimum after the device is powered on, the detected reference position is updated to a reference position corresponding to the operation speed of the movable input member.

4. An optical apparatus, comprising:
an optical element;
a reference position detector unit for detecting that the optical element passes through a reference position;
a relative position detector unit for detecting a relative position of the optical element; and
a controller for outputting to an external device a position signal for the optical element, after the optical apparatus is powered on and the optical element has passed through the reference position with an operation speed which is equal to or slower than a threshold speed, based on a reference position detection result obtained by the reference position detector unit and a relative position detection result obtained the relative position detector unit,
wherein the threshold speed is slower than a maximum operation speed of the optical element.

5. An optical apparatus according to claim 4, wherein the position signal is output to the external device while a predetermined reference position is associated with a relative position at a time when the optical apparatus is powered on until the moving speed of the optical element at the time when the reference position is detected becomes equal to or slower than the threshold speed after the optical apparatus is powered on.

6. An optical apparatus according to claim 5, further comprising a memory for storing multiple reference positions corresponding to multiple operation speeds of an optical element,
wherein when an operation speed of the optical element at a time when a reference position is detected is minimum after the optical apparatus is powered on, the detected reference position is updated to a reference position corresponding to the moving speed of the optical element.

7. An optical apparatus according to claim 5, wherein:
the reference position detector unit is located close to a moving end of the optical element; and
the optical element is moved between the moving end and the reference position detector unit when the optical apparatus is powered off.

8. An optical apparatus according to claim 5, wherein:
multiple reference position detector units are provided; and
the optical element is moved between the multiple reference position detector units when the optical apparatus is powered off.

9. A reference position setting method for an operation device for an optical apparatus, which includes an optical element, a movable input member operated by an operator for controlling the optical element, a reference position detector unit for detecting when the movable input member passes through a reference position, and relative position detector unit for detecting a relative position of the movable input member, and which outputs a control signal for the optical apparatus based on an amount of movement of the movable input member,
the reference position setting method being a method of setting the reference position of the movable input member, comprising:
powering on the operation device;
detecting an operation speed of the movable input member when the reference position is detected;
comparing the operation speed of the movable input member with a threshold speed; and
outputting the control signal, wherein the control signal is not output when the operation speed of the movable input member is faster than the threshold speed, and the control signal based on the reference position and the relative position is output when the operation speed of the movable input member is equal to or slower than the threshold speed,
wherein the threshold speed is slower than a maximum operation speed of the movable input member.

10. An operation device according to claim 1, wherein the controller calculates and outputs the control signal without using the reference position detection result obtained by the reference position detector unit when (i) the device is powered on and the input member has not passed through the reference position with an operation speed which is equal to or slower than the threshold speed and (ii) the input member has passed through the reference position with the operation speed which is faster than the threshold speed.

* * * * *